INVENTOR:
WILHELM MULLER

United States Patent Office 2,792,624
Patented May 21, 1957

2,792,624

PROCESS FOR MAKING ARTICLES HAVING WEAR RESISTANT OUTER SURFACES

Wilhelm Müller, Pfronten-Steinach, Germany

Application November 25, 1952, Serial No. 322,405

Claims priority, application Germany November 30, 1951

2 Claims. (Cl. 29—420.5)

The present invention relates to manufacture of articles having outer surfaces which are highly resistant to wear and processes for making such articles. These articles may be any articles requiring smooth outer surfaces which are highly resistant to wear. For example, all types of measuring instruments, such as a calipers and guages of all types, and many other articles such as textile rolls, nozzles, valves, valve seats and articles required to have a high resistance to chemical action.

One of the objects of the present invention is to provide articles with an outer surface which is highly resistant to wear from frictional rubbing so that these articles, such as guages, calipers, and the like will have a long life during which their size remains constant.

Another object of the present invention is to provide articles with outer surfaces which are highly resistant to high temperatures and chemical action.

A further object of the present invention is to provide a wear resistant article which includes, in part, waste products of other articles.

Still another object of the present invention is to provide processes for conveniently making articles of the above type in a very simple, convenient and inexpensive way.

With the above objects in view, the present invention mainly consists of a wear-resistant article having an outer surface portion in which diamond particles or the like are distributed without projecting therefrom. This outer surface portion may be electroplated onto the article, and also an outer surface may be provided by condensing a vaporized metal onto the article. Also, the particles, such as diamond particles or the like, may be pressed into the wear resistant article by a roller with or without the application of heat to the wear-resistant article.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
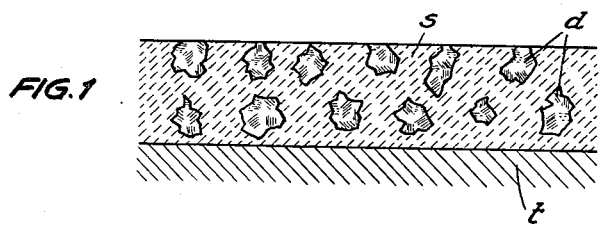
Fig. 1 is a sectional, fragmentary view, on a greatly enlarged scale, of a body of material having an outer surface portion constructed in accordance with the present invention.

Referring now to the drawings, there is shown in Fig. 1 a body of material $t$ having located thereon an outer layer $s$ in which the particles $d$ are embedded and distributed. The materials from which part $s$, $t$ and $d$ are made will depend largely upon the use for which the article is intended. Where the sole object is resistance against frictional rubbing, the layer $s$ may be made of a steel or other hard metal alloy such as a tungsten-carbide alloy, and if, at the same time, resistance to chemical action is desired this outer layer $s$ will be made of such materials as chrome-nickel steels, Stellite or other hard chrome metal alloys. To obtain a high resistance to heat and wear the layer $s$ may be made of chrome steels.

As an example of materials highly resistant to mechanical friction and chemical action, as well as resistant to high temperatures, metal oxides such as aluminum oxide, carbides such as silicon carbides, or ceramic materials are suitable for the layer $s$.

For most purposes, the particles $d$ will be made of tiny diamond particles such as a diamond dust, and experience has shown that the mechanical properties of the outer layer $s$ depends to a great extent on the size of the particles. It has been shown that the wear resistance of a layer $s$ having a constant diamond content increases with a decrease in the size of the particles. For almost all purposes these diamond particles should not have a thickness of over 0.005 mm., although it should be noted that for certain types of calipers diamond particles having a thickness of not over 0.015 mm. have proved satisfactory.

In order that the outer surfaces of calipers, guages, and the like, shall not scratch or otherwise dig into the pieces being measured, it is essential that the diamond particles be substantially free of sharp points. It is possible to blunt the diamond particles through a chemical process such as treatment in molten carbonates, or by the application of a heat of about 1000° C. The simplest method for depriving the diamond particles of sharp points, however, is to grind the outer surface of the layer $s$ so that none of the diamond particles project therefrom, as is apparent from Fig. 1 where there are shown diamond particles which have been sheared off flush with the outer surface of layer $s$.

The best source for dull diamond particles is to be found at places where grinding wheels having sharp diamond particles therein are used. The diamond particles of such grinding wheels fall out of the same when they become dull and these otherwise worthless diamond particles are eminently suitable for the purposes of the invention, so that the invention has the great advantage of providing a use for materials which would only have a waste value.

It is apparent from the foregoing that the invention has nothing to do with diamond particles of the type used in grinding and polishing tools, since the articles of the invention are purposely made so that they will not scratch or otherwise dig into work pieces or the like with which articles having a surface constructed in accordance with the present invention are used.

Many processes may be used to provide articles with hard wearing outer surfaces in accordance with the present invention. It is possible to electroplate the layer $s$ onto the material $t$ in a very convenient manner and with a great economy of the diamond particles $d$ located in the layer $s$, but for some purposes the joint made by electroplating is too weak.

Figure 2:
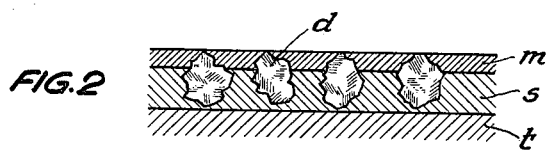
Fig. 2 is a sectional, fragmentary view, on a greatly enlarged scale, of a body of material provided with an outer surface portion different from that of Fig. 1 and constructed in accordance with the present invention.

The construction of Fig. 2 is made in accordance with the invention by a process in which the diamond particles $d$ are only partly located in the layer $s$ electroplated onto the body $t$, so that these particles $d$ project from the layer $s$, as is clearly apparent from Fig. 2. The particles $d$ may be about half way embedded in the layer $s$. In order to overcome the disadvantage of the weakness of an electroplated layer $s$, there is provided on top of the latter a layer $m$ of a very hard, wear-resistant material, and this layer $m$ fills the spaces between the portions of the particles $d$ which project from the layer $s$ so that none of these particles project from the layer $m$. For example, there is shown at the left of Fig. 2 a particle $d$ which extends up to but not beyond the outer surface of the layer $m$. The layer $m$ may, for example, be made from hard, wear-resistant materials such as corundum or a hard carbide such as silicon carbide, boron carbide, or tungsten carbide. A final grinding of the outer surface of layer $m$ is advisable to uncover at this outer surface of the layer $m$ a part of the diamond particles $d$ as is shown, for example, by the left-most diamond particle in Fig. 2.

Because of the small size of the particles $d$, the thickness of the layer $m$ is also quite small. For example, where the diamond particles have a thickness of 0.005 mm., the electroplated layer $s$ may have a thickness of 0.003 to 0.004 mm. so that only a thickness of 0.001 to 0.002 mm. of the layer $m$ is required to be condensed onto the layer $s$. Where larger diamond particles, for example having a thickness of 0.015 mm. (such as are suitable for certain types of calipers, as was mentioned above) are used, the layer $m$ need only have a thickness of 0.002 to 0.003 mm. with a correspondingly thicker electroplated layer $s$ so that the cost of the process of vaporizing and condensing the hard metal of the layer $m$ may still be kept down to a minimum.

Figure 3:
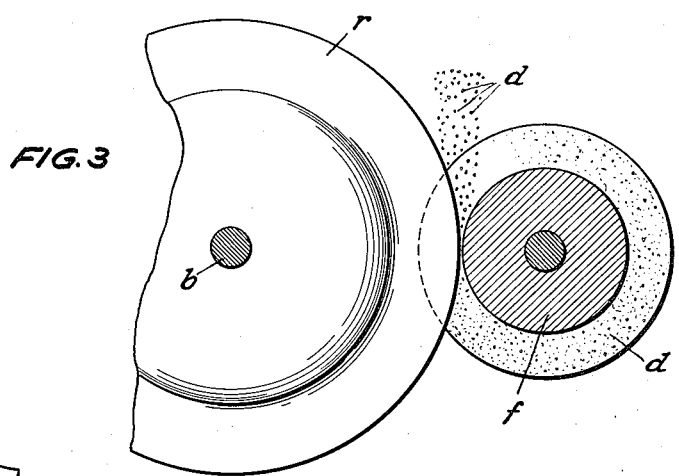
Fig. 3 is a fragmentary, diagrammatic, partly sectional view of a process for providing an article with a wear resistant outer surface in accordance with the present invention.
Figure 4:
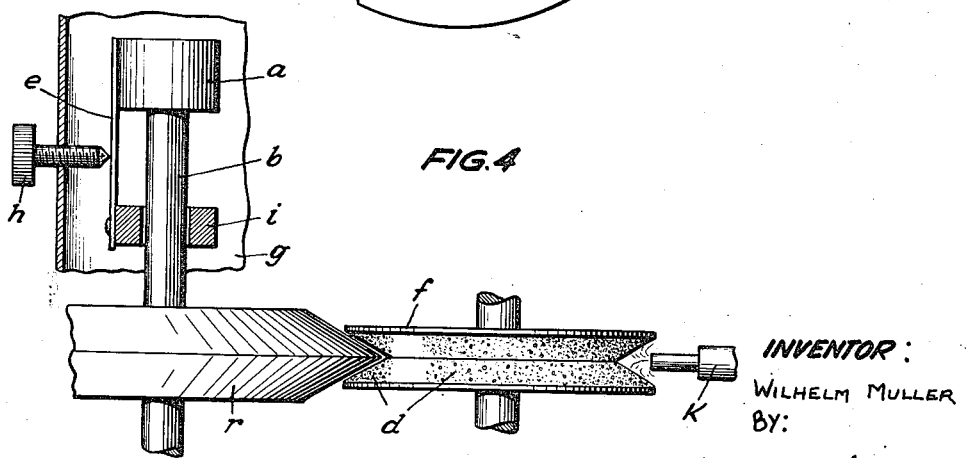
Fig. 4 is a fragmentary, diagrammatic, partly sectional, top plan view of the process illustrated in Fig. 3.

A further highly advantageous process for providing a hard wearing surface portion on an article is illustrated in Figs. 3 and 4 which schematically show the manufacture, for example, of a winding or guide roller for threads, yarns, or the like, of textile machines. The thread-guide roller $f$ may be made of a steel or a hard bronze and has a V-shaped annular periphery into which the V-shaped counter-profile of roller $r$ extends, as is clearly shown in Figs. 3 and 4, this counter-roller $r$ being made of a harder material than the circular, thread-guide member $f$.

As is shown in Fig. 4, a motor $a$ is connected at its drive shaft $b$ to the roller $r$ to turn the latter, this motor $a$ being carried by a bracket $e$ which is movable on a support $g$, by turning of the screw member $h$ which engages the bracket $e$, the latter carrying a bearing $i$ for the shaft $b$. The member $f$ may be independently rotated or may turn by frictional engagement with the roller $r$, and in either event these members $r$ and $f$ turn at a relatively slow speed.

During the slow rotation of the roller $r$ and the roller $f$, a plurality of diamond particles $d$, forming a diamond dust, is poured downwardly between the roller $r$ and the member $f$ so as to be pressed by the roller $r$ into the outer surface of the annular periphery of the member $f$. Part of the diamond particles $d$ simply fall while others thereof enter into the roller $f$ by pressure from roller $r$. The pouring of the diamond dust $d$ is terminated when the entire outer periphery of member $f$ is provided with a substantially uniform layer of diamond particles. Then, the member $h$ is turned to gradually and slowly move the roller $r$ toward the roller $f$, which is supported for rotation by any suitable structure (not shown). Thus, the roller $r$ presses forcefully against the roller $f$ to press the diamond particles into the latter and at the same time to provide a smooth polished profile on the member $f$ which corresponds to the configuration of the outer periphery of the roller $r$, this process also serving to cold work the outer surface portion of the roller $f$ to greatly strengthen the same and at the same time to increase the density thereof.

The advantages of this process are that no finish grinding is required, and such finish grinding is usually very costly because of the special tools that are required. Moreover, the outer surface portion produced by this process consists of substantially a single layer of diamond particles distributed through the outer surface of the member $f$. For the sake of clarity the supports, bearings, and the like of the roller $f$ have been omitted from Figs. 3 and 4.

It is of advantage in some cases to render the above described process easier to perform by applying heat to the outer surface of the member $f$ into which the diamond particles are being pressed, and Fig. 4; illustrates a conduit $k$ connected to a suitable source of combustible gas or the like which is ignited to provide a flame which plays against the outer surface of the periphery of the member $f$, while the diamond particles $d$ are being pressed into the latter.

The above-described process illustrated in Figs. 3 and 4 is of particular advantage when combined with processes where the diamond carrying layer is poured or electroplated onto a body of material or otherwise joined thereto. With processes of the latter type it is necessary to grind the outer surface to prevent diamond particles from projecting therefrom so as to produce an outer surface such as that shown at the outer surface of layer $s$ of Fig. 1. However, all of this grinding and finishing of such a layer may be avoided by applying against the outer surface of the article a roller such as the roller $r$ of Figs. 3 and 4 which presses the outer surface portion of the article so as to push into the same any diamond particles which happen to project therefrom, and which also polishes, hardens, and densifies the outer surface of the article as well as accurately forming the same to a predetermined profile. Thus with this process all of the grinding and polishing steps which would otherwise be required are practically eliminated or may be reduced to an absolute minimum.

It should be mentioned that it is possible to use as a binder for the diamond particles $d$, metals, alloys, oxides, or the like which become sintered in their final condition or produce a diffusion of the different components of the alloy so that the final layer of the binder material is too hard to be cold worked by a roller such as the roller $r$ of Fig. 4. In this latter event, the finishing process of the diamond carrying layer is performed at an intermediate stage before the binder material attains its final form and before it becomes too hard, and in such a process heat is applied to the article after the above steps so as to bring the binder material to its final, hard condition.

The process illustrated in Figs. 3 and 4 and described above also lends itself to the manufacture of diamond cutting tools for grinding and polishing purposes.

Diamond is a fairly expensive material, and in order to reduce the cost of manufacture of the articles according to the invention, it is possible to provide particles which are only partly composed of diamonds and which also include particles of hard material such as corundum or a hard carbide of the same size as the diamond particles. The extent to which the diamond particles may be replaced by particles of a different material depends upon the thickness of the outer layer of the article and the purpose for which it is intended.

It will be understood that each of the elements described above, or two or more together, may also find a useful application in other types of articles having a wear-resistant outer surface and processes for making the same differing from the types described above.

While the invention has been illustrated and described as embodied in articles such as measuring devices, rollers, nozzles, valves, and the like, having a wear-resistant outer surface and processes for making the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process for the production of a wear-resistant article provided with an outer layer of hard facing material having a smooth non-abrasive outer surface, comprising the steps of applying an outer layer of hard facing material to an inner supporting layer of metal; distributing and firmly embedding a plurality of diamond particles throughout said outer layer; and grinding, flush with the outer surface of said outer layer, all projecting points of said particles extending from said outer surface.

2. A process as defined in claim 1 wherein said outer surface consists of a chromed, hard metal.

References Cited in the file of this patent

UNITED STATES PATENTS

| Number | Name | Date |
|---|---|---|
| 604,569 | Ringstrom | May 24, 1898 |
| 1,811,487 | Belding | June 23, 1931 |
| 1,848,182 | Koebel | Mar. 8, 1932 |
| 2,043,142 | Zublin | June 2, 1936 |
| 2,290,338 | Koehring | July 21, 1942 |
| 2,299,778 | Wissler | Oct. 27, 1942 |
| 2,299,877 | Calkins | Oct. 27, 1942 |
| 2,306,423 | Bernstorff | Dec. 29, 1942 |
| 2,318,263 | Smith | May 4, 1943 |
| 2,349,825 | Kelleher | May 30, 1944 |
| 2,354,113 | Gould | July 18, 1944 |
| 2,367,286 | Keeleric | Jan. 16, 1945 |
| 2,388,020 | Suwa | Oct. 30, 1945 |
| 2,456,761 | Williams | Dec. 21, 1948 |
| 2,582,231 | Catallo | Jan. 15, 1952 |
| 2,626,458 | Lieberman | Jan. 27, 1953 |
| 2,704,705 | Gifford | Mar. 22, 1955 |

FOREIGN PATENTS

| 8,265 | Netherlands | Feb. 15, 1923 |